United States Patent [19]
Pringle

[11] 3,709,155
[45] Jan. 9, 1973

[54] AUTOMOBILE HOLD-DOWN DEVICE

[75] Inventor: William L. Pringle, Grosse Pointe Shores, Mich.

[73] Assignee: Pullman Incorporated, Chicago, Ill.

[22] Filed: March 22, 1971

[21] Appl. No.: 126,820

[52] U.S. Cl..........105/368 R, 105/368 T, 105/366 C
[51] Int. Cl..........................B60p 7/08, B61d 45/00
[58] Field of Search.105/366 C, 368 R, 368 B, 368 T, 105/369 A; 248/119 R, 361 A; 280/179 A; 296/1 A

[56] References Cited

UNITED STATES PATENTS

| | | | |
|---|---|---|---|
| 2,944,492 | 7/1960 | Clejan | 105/368 T |
| 3,102,646 | 9/1963 | Clejan | 105/368 T |
| 3,188,042 | 6/1965 | Watters | 105/368 T |

*Primary Examiner*—Drayton E. Hoffman
*Attorney*—Hilmond O. Vogel and Richard J. Myers

[57] ABSTRACT

An automobile hold-down device for use on a railway vehicle and having hook members operatively attached to rotating arm members and movable automatically in a vertical direction from a below deck inoperative position upon horizontal movement of an interconnected yoke member and said hook members movable in a transverse direction to locking engagement with the automobile frame in response to operation of a rotating cam means connected with the hook members to securely fastened the automobile during transport. A series of such hold-down devices are locked and unlocked by longitudinally extending cables which are driven by manually actuated drive means.

19 Claims, 5 Drawing Figures

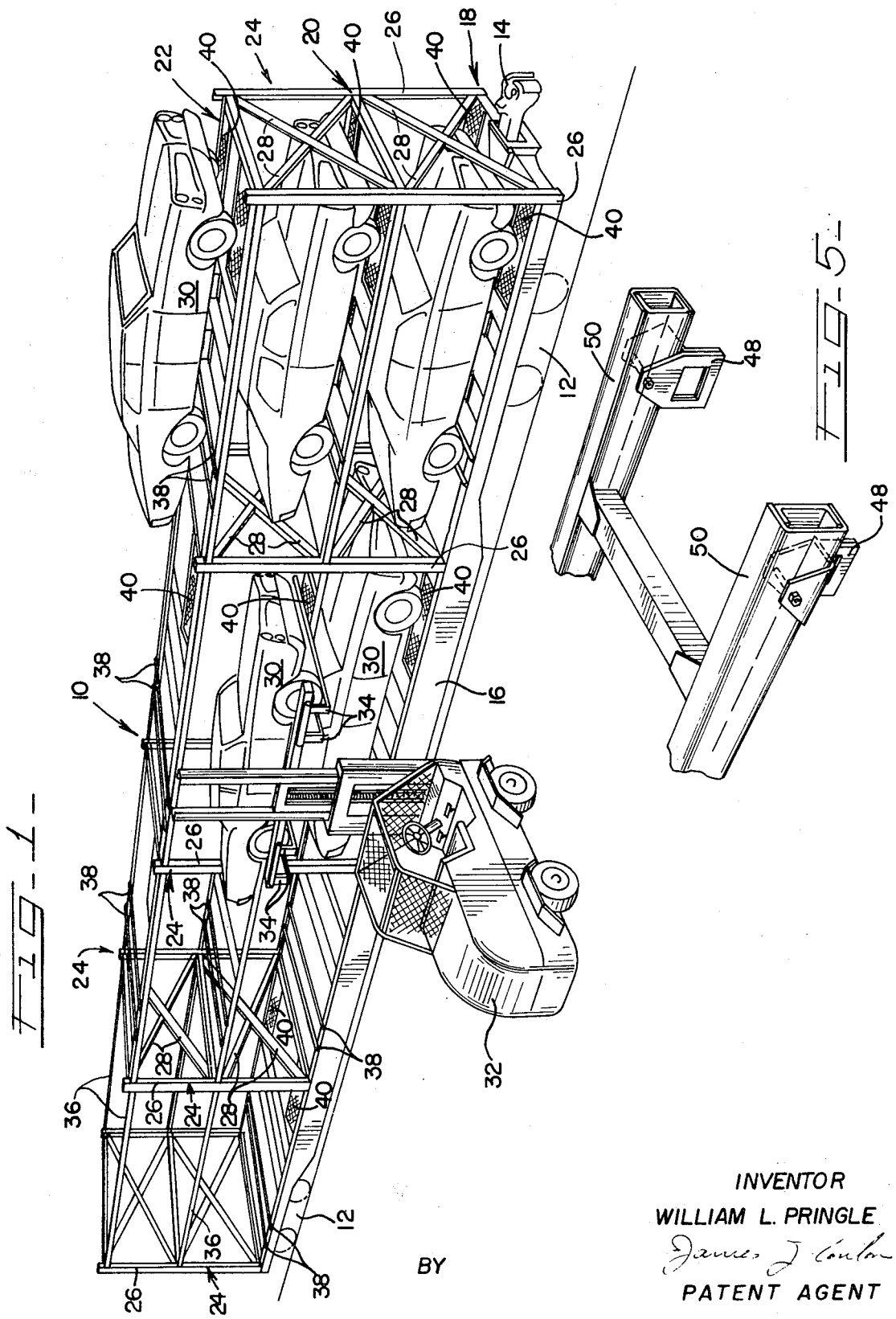

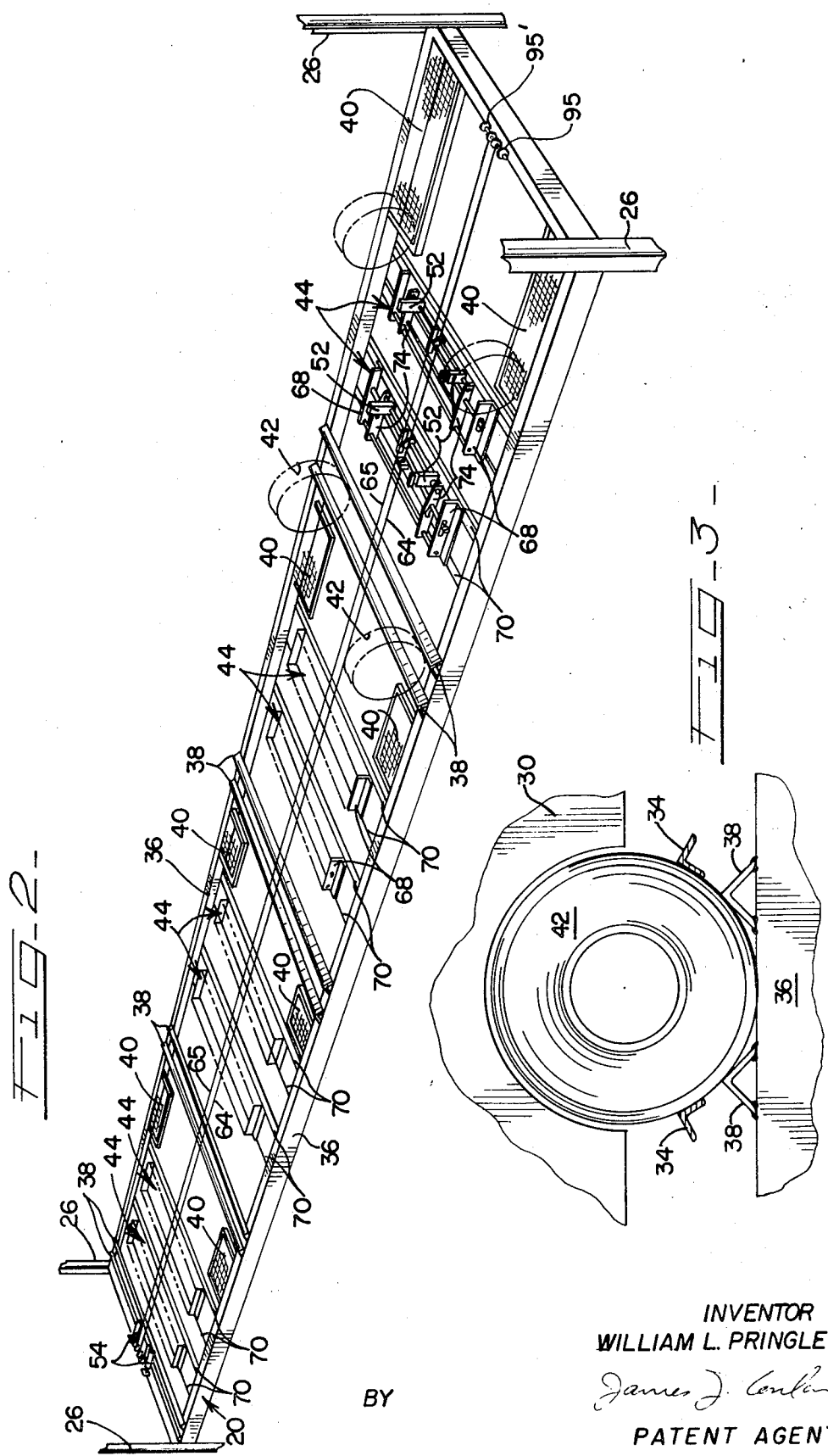

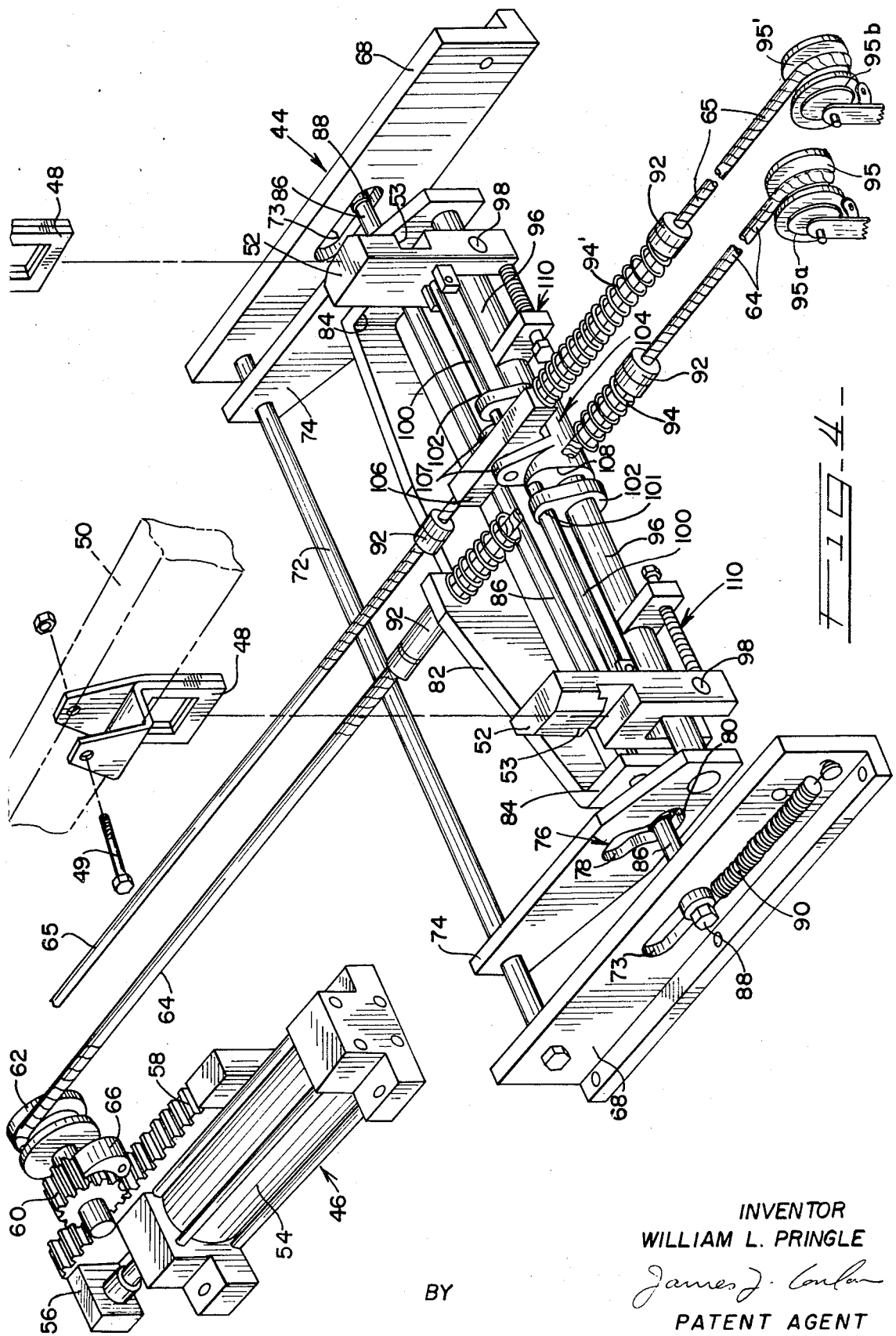

AUTOMOBILE HOLD-DOWN DEVICE

SUMMARY

The present invention pertains to an automobile hold-down device used in conjunction with a vehicle suitable for transport of automobiles either by rail or by truck. A power cylinder having a longitudinally extended cable which is connected with the hold-down mechanism raises and lowers the locking hook means of the mechanism from below the vehicle deck. A second cylinder and cable are connected to a rotating cam means of the mechanism which drives a pair of follower arms which are connected to and move the hook means laterally into locking position on a suitable hold-down bracket on the automobile being transported. Spring biased take-up spools at the ends of the vehicle opposite the operating power cylinder take up slack in the cables and operate to unlock the mechanism when the power cylinders are released.

A purpose of the invention is to provide an improved automobile hold-down device which is economical to operate, reliable and eliminates the manual labor involved with conventional hold-down means which require a man to move from car to car after they are loaded on the vehicle to engage hold-down hooks or chains, etc. The present invention is automatic insofar as once the automobiles are in position for transport on the vehicle the only labor involved requires actuation of the power cylinder which is used to operate the hold-down mechanisms which secure the automobiles for transport.

Another purpose of the invention is to provide an improved hold-down device which may be stored below the deck of a transporting vehicle to thereby allow the automobiles to be driven on or loaded onto the transport vehicle as by side loading without requiring that the automobile be raised to clear an upstanding hold-down device.

These and other objects of the invention will become apparent from reference to the following description, appended claims and attached drawings.

BRIEF DESCRIPTION OF THE DRAWINGS

FIG. 1 is a pictorial illustration of a railway vehicle used to transport automobiles and employing the hold-down device of the present invention, with details of the hold-down devices omitted for clarity;

FIG. 2 is a pictorial illustration of a deck portion of the railway vehicle illustrated in FIG. 1 with a pair of hold-down devices shown in detail and additional devices shown in phantom for purposes of clarity;

FIG. 3 is an illustration of the relative positions of the rear wheels of the automobile, the positioning means on the car deck, and the automobile lift-off members which engage the wheels to lift the automobile from the railway vehicle;

FIG. 4 is a perspective illustration of the automobile hold-down device; and

FIG. 5 is a removed and enlarged section of an automobile underframe including hold-down brackets.

DETAILED DESCRIPTION

Referring now to the drawings and in particular to FIG. 1 where there is illustrated an automobile rack car 10 having the usual spaced trucks 12 and coupler 14, it will be noticed that the rack car 10 includes longitudinally extending structural underframe members 16 and a series of vertically spaced deck means 18, 20, 22. Extending upward from the lower deck 18 and attached to the underframe member 16 are a series of vertically extending longitudinally spaced supporting bulkheads 24 comprising essentially upright structural members 26 and crisscrossing structural members 28. The cubicle areas enclosed by the deck portions and the bulkheads are suitable for positioning of the automobiles for subsequent transport of the same. On top of the upper deck 22 and in line with the lower cubicles as defined previously is positioned a third level of automobiles. Automobiles 30, as illustrated in FIG. 1, are side loaded onto the railway vehicle by means of a lift truck 32 which may be of any conventional design with the addition of substantially longer hook portions 34 extending therefrom which are the width of an automobile and positioned in pairs so as to cradle both sides of an automobile tire and thereby securely hold the automobile during transport from the ground into position on the railway vehicle or during the removal from the railway vehicle 10. The invention is not restricted to side loading and conventional drive-on loading may be used since the hold-down device assumes a below deck unobstructive position when inoperative.

Referring now to FIG. 2 where there is illustrated a typical deck portion 20, it will be noticed that the deck includes longitudinally extending side frame members 36. Extending transversely between the frame members 36 are wheel positioning angle members 38. Longitudinally spaced from the positioning members 38 are flat wheel support portions 40 which are sized in their length and width and spacing from the angle members 38 so as to accommodate the various wheel base lengths and car widths which are present in the industry.

As illustrated in FIG. 1, cars transported in railway vehicles having a structure as aforementioned are side loaded onto the vehicle for shipment thereon. It is contemplated with the present invention that the automobile rear wheels 42 be positioned between the angle members 38 to thereby establish a permanent reference dimension or reference point for location of fastening and attaching means. After positioning of the automobile on the deck of the vehicle, the hold-down device of the present invention is operated to engage the automobile and securely fasten it to the railway vehicle. The hold-down device includes a hold-down mechanism 44 powered by a drive means 46. The hold-down mechanisms 44 are longitudinally spaced along the length of the railway vehicle beneath the automobile for movement during operation onto the automobile structure for fastening thereto. It is contemplated in the present invention that a pair of hold-down mechanisms 44 be incorporated in holding down each automobile which is transported. The mechanisms 44 are spaced from the wheel supporting angle members 38 a fixed distance to align with a hold-down bracket 48 which may be attached as by fastener 49 to a particular section of the automobile frame 50. The automobile frame alone may be adequate for attachment of the hold-down means if it contains a portion suitable for clamping by the hold-down mechanism, in which case no hold-down brackets would be required.

Referring now to FIG. 4 for a more detailed description of the hold-down device, it will be noticed that the mechanism 44 consists essentially of a pair of transversely spaced hook-members 52 which are movable from a below deck position to an operative position wherein the hooks are raised vertically to be in alignment with the hold-down bracket 48 of the automobile 30; then the hooks are pivoted and the hook nose or hooking portions 53 are moved transversely into the bracket openings. The mechanism 44 is then operated to lower the hooking portions about the opening of the bracket 48 to fixedly secure the car by the hold-down mechanism. The illustration in FIG. 4 depicts the position of the hold-down mechanism as it would appear prior to insertion of the hooking portions 53 into the hold-down bracket 48.

The mechanism is powered by cylinders 54 which are assembled in pairs and attached at one end of the railway vehicle. The cylinders 54 include a head portion 56 which includes a rack gear 58 which moves longitudinally in response to movement of the power cylinder and operates in conjunction with a pinion gear 60 to rotate the pulley 62 and thereby either feed out or retract the cable 64. For purposes of clarity only one of a pair of power cylinders is illustrated in FIG. 4; however, it is to be understood that cable 65 is connected with an associated power cylinder and gear arrangement identical with the arrangement associated with cable 64. A pawl 66 is positioned adjacent the pinion gear 60 to permit counterclockwise rotation of the pinion 60 and allow the cable to be reeled onto the pulley 62. The pawl 66 prevents unintentional clockwise rotation of the pinion and serves as a releasing means to disengage the hook members 52 from the bracket 48 when it is desirable to remove the automobiles from the railway vehicle.

The hold-down mechanism includes transversely spaced bracket plates 68 rigidly secured to and supported by the support members 70. The bracket plates are interconnected by means of a connecting shaft 72 and contain opposed slot portions 73. Attached to and extending from the shaft 72 are pivoted plates or arms 74 having a slot means 76 which includes first and second vertically spaced slot portions 78, 80. The plates 68, the shaft 72 and plates 74 are constructed to permit rotation of the plates 74 about the shaft 72. Positioned between the plates 74 is a yoke 82 having longitudinally extending end portions 84 which contain shaft portions 86 fixedly attached thereto and extending therefrom through the slot 76 in the plate 74 and through the slot 73 in the plate 68. The outer portion of the shaft 86 includes a cap means 88 which retains the yoke 82 in position and is used to attach a spring 90. The top portion of the yoke includes an opening for movement of the cable 64. The cables 64 and 65 include fixedly attached collar members 92 and coil spring cable retaining devices 94, 94'. At the end of the railway vehicle opposite the cylinders 54 are spring loaded spools or reels 95, 95' which store a portion of the cables 64, 65 when the hold-down device is inoperative. The spools also function to supply tension to the cables by means of biasing springs 95a, 95b to thereby combine with spring 90 to unlock the mechanism from the autos when the pawl 66 is removed from the pinion 60.

Extending between the plates 74 and fixedly attached thereto as by a weld, is a support shaft 96 which carries the hook members 52 and a means for positioning and moving the hook members 52. The hooks 52 are pinned to the shaft 96 by a pin means 98 which permits pivoting of the hooks 52 in a transverse direction. A follower rod 100 is attached to the hooks 52 and extends inward through the opening 101 in the lug 102. The opening is larger than the diameter of the follower rod and thereby permits lateral movement therethrough. Lug 102 is fixedly secured to the shaft 96. The central portion of the shaft 96 includes a collar cam member 104 fitted about the shaft in such a manner as to permit relative rotation of the collar 104 on and about the shaft 96. The collar 104 includes a connecting means 106 and ears or lug portions 107 for attaching the cable 65 thereto. The ends or face portions 108 of the collar 104 are cammed surfaces which contact the follower rod 100. When the collar 104 is rotated the follower rods 100 will move laterally. A tensioning means 110 is attached to the shaft 96 and to each hook 52 to supply a biasing means to retain the follower rods 100 in contact with the cam surface 108 of the collar 104.

THE OPERATION

The automobiles 30 are side loaded onto the railway vehicle and the rear wheels positioned in the angle members 38. When the hold-down device of the present invention is operated, the hook members 52 are raised from a below deck position into a position adjacent the hold-down brackets 48 which are fixedly attached to the automobile frame 50. The second part of the operation of the hold-down mechanism involves moving the hooking portions or noses 53 of the hooks 52 into the opening of the bracket 48. Once this positioning is accomplished, a third operation of the mechanism is performed whereby the hook members are retracted toward the deck of the railroad vehicle to securely fasten the automobiles for transport.

Referring now to FIG. 4 for a more detailed description of the operation of the hold-down device, it is noticed that the position of the mechanism 44 illustrated is the intermediate or second position which occurs after the hook members 52 have been raised from a flush position with the car deck to an above deck position adjacent the hold-down bracket 48 of each automobile. To move the hooks 52 outwardly to engage the bracket 48 the cable 65 is moved longitudinally by its power cylinder and toward the cylinder 54, and in such movement rotates the collar 104 counterclockwise (as viewed in FIG. 4) during which time the shaft 96 remains stationary and does not rotate. Thus, the relative rotational movement between the collar 104 and the stationary shaft 96 combined with the contact between the follower arm 100 and the cam surface 108 produces an outward movement or rotation of the hooks 52. This outward movement of the hooks results in an insertion of the hook nose portion 53 in the slot of the bracket 48.

The final locking movement of the mechanism involves a longitudinal movement of the cable 64 which results from operation of the power cylinder 54. The rack gear 58 moves toward the mechanism 44 and produces a counterclockwise rotation of the pinion 60, as viewed in FIG. 4; this moves the cable 64 which is in turn connected to the yoke 82. The longitudinal movement of the yoke and its associated shaft 86 is purely in a longitudinal movement since the shaft 86 is confined in the slot 73 of the bracket plate 68. This longitudinal movement of the yoke 82 and its shaft 86 extends spring 90 placing it in tension. In moving toward the power cylinder the shaft 86 of the yoke 82 will produce a partial clockwise rotation of the plates 74 about the shaft 72 which is caused by the relative movement of the shaft 86 through the slot portions 78 and 80 in the plates 74. This rotation of the plates 74 results in a downward movement of the hook members 52. It is in this downward movement of the hooks 52 that the automobiles are firmly secured to the railway vehicle. With this operation of the power cylinder 54 which produces counterclockwise rotation of the pinion 60, rotation caused by this longitudinal movement is stored in the pinion by virtue of the pawl 66 which prevents clockwise rotation of the pinion. Thus it is noticed that after the automobiles are locked down the mechanism is released by simply removing the pawl 66 from the pinion 60 at which time the coil springs 90 will return the yoke to the position illustrated in FIG. 4. To remove hooks 52 from engagement with the hold-down bracket 48 the pawl 66 which restrains the pinion 60 and is driven by the second power cylinder (not shown) is removed, allowing the cable to move away from the cylinder and allowing the head assembly 56 to move toward its power cylinder. The cable moves away from the cylinder by forces generated by spring 95b which reel in the cable onto the spool 95' positioned at the end of the railway vehicle opposite the power cylinders. After disengagement of the hooks 52 from the automobile the power cylinder 54 is again operated to rotate the pinion in a counterclockwise direction which produces a movement of the yoke 82 towards the power cylinder resulting in a downward movement of the plate 74 and the hooks 52. This downward movement is sufficient to lower the hooks below the deck so as to not obstruct loading of the railway vehicle. Coil springs 94 are positioned between the collars 92 on the cables 64, 65 and function primarily to take up slack, remove stress from the cables and supply equal distribution of operating forces to each holddown mechanism when the power cylinder operates.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. A hold-down device for securing an automotive vehicle to a transporting vehicle, said device including:
   support bracket plates joined by a connecting shaft and pivoted plate members being connected with and rotatable about the connecting shaft;
   a support shaft joining said plate members;
   pivoted hook members being engageable at their upper ends with the associated automotive vehicle and connected at their lower ends to the support shaft carried by pivoted plate members and said plate members rotatable to produce substantially vertical movement of the hook members;
   an operating yoke means having shaft portions engaging the pivoted plate members for actuating the pivoted plates to thereby raise and lower the hook members;
   a cam means engaging the hook members and being positioned on and rotatable about said support shaft to move the hook members pivotally into position with the automotive vehicle whereby pivotal upward movement of the plate members to raise the hook members is followed by operation of the cam means to urge the pivoted hook means into position with the automotive vehicle and final downward pivoted locking movement of the plate members to fixedly secure the automotive vehicle to the transporting vehicle;
   drive cylinder means being connected to the yoke means to move yoke means horizontally and connected to the cam means to rotate same.

2. The invention according to claim 1, and:
   the pivoted plate members each including a slot means having interconnected vertically spaced and horizontally spaced portions;
   the operating yoke means movable horizontally and the yoke shaft portions extending through the slot means in a respective pivoted plate member and movable through the spaced slot portions to thereby rotate the respective plate member.

3. The invention according to claim 1, and:
   the hook members including pivoted follower means to operatively engage the cam means;
   said cam means being rotatable in a forward direction to drive the follower means and produce pivotal movement of the hook members;
   said cam means being rotatable in a reverse direction;
   said hook members including a biasing means to maintain contact between the cam means and the follower means when the cam means is rotated in the forward direction;
   said biasing means disengaging the hook members from the automotive vehicle when the cam means is rotated in the reverse direction.

4. The invention according to claim 1, and:
   a fixed plate member positioned outboard of the yoke means and including a horizontally extending slot;
   said shaft portions extending into the horizontally extending slot to confine and guide the yoke means.

5. The invention according to claim 1, and:
   cable means connecting with the yoke and with said cam means;
   the drive cylinder means including rack and pinion members adapted to be mounted on said transporting vehicle and operatively connected by the cable means to move the yoke means horizontally to thereby lower the hook members;
   said drive cylinder means operatively connected by the cable means to rotate the cam means to move the hook members into position for engagement with the automotive vehicle.

6. The invention according to claim 1, and:
   said drive cylinder means including a first power cylinder and a second power cylinder with each cylinder having an associated rack gear member and pinion gear member operatively connected thereto;

each pinion gear rotatable in a forward and in a reverse direction;

a pawl positioned adjacent and engaging each pinion gear to permit pinion gear rotation in a forward direction as each associated power cylinder operates;

cable members each having opposed end portions operatively connected at one end to an associated power cylinder and extending lengthwise of the transporting vehicle to operate the hold-down device;

a pair of spring biased spools;

each of said cable members being attached at its opposite end portion to a respective spring biased spool;

the operation of the power cylinders securing the hold-down device to the automotive vehicle and each pawl engaging the associated pinion gear preventing release of the hold-down device by preventing reverse rotation of the pinion gear; and each pawl manually disengageable from its associated pinion gear to permit the spring biased spools to gather the cable members and to assist in disengaging the hold-down device from the automotive vehicle.

7. The invention according to claim 1, and:

said transporting vehicle having a deck supporting the automotive vehicle;

the hold-down device positioned below the deck in the inoperative position to permit unobstructed loading of the automotive vehicles on the deck.

8. The invention according to claim 1, and:

said drive cylinder means having a first cable member in communication with the yoke means and a second cable member in communication with the cam means;

the first and the second cable members each having a collar and spring connection with the respective yoke and cam means to transmit operating forces from the cable members into the yoke means and into the cam means.

9. A hold-down device for securing an automotive vehicle to a transporting vehicle comprising:

hook means being mounted on the transporting vehicle and being adapted for engagement with and tying down of an associated automotive vehicle to the transporting vehicle;

support shaft means on said transporting vehicle for pivotally carrying said hook means and rotatable arm means supporting said support shaft means for upward movement of the hook means toward the automotive vehicle;

a drive yoke having coupling means cooperative with said arm means for raising and lowering rotation of said arm means attendant to raising and lowering said support shaft means; and drive cam means rotatably mounted on said support shaft means and spaced laterally of said hook means and engageable with said hook means attendant to forced pivoting said hook means outwardly for locking engagement with said automotive vehicle.

10. The invention according to claim 9, and drive means connecting with the cam means and with the yoke means, and the cam means and the yoke means each having sequential drive structure connecting with said drive means for imparting sequential movement to the hook means whereby the hook means is elevated and then pivoted laterally into locking engagement with said automotive vehicle.

11. The invention according to claim 10, and said drive means comprising:

sequential power means operatively connected with the yoke means attendant to lowering the hook means and operatively associated with the cam means to move the hook means laterally outwardly;

yoke biasing means operatively connected with the yoke and opposing the power means and thereby storing energy in the yoke biasing means;

yoke energy locking means operatively connected with the yoke means and yoke biasing means for storing energy in the yoke biasing means during the power stroke of the power means;

cam biasing means operatively connected with the cam means and opposing the power means and thereby storing energy in the cam biasing means;

cam energy locking means operatively connected with the cam means and the cam biasing means for storing energy in the cam biasing means during the power stroke of the power means;

the operation of the power means securing the hold-down device to the automotive vehicle and each energy locking means cooperatively preventing release of the hold-down device and being released to permit its respective biasing means to cause disengagement of the hold-down device from the automotive vehicle.

12. The invention according to claim 11, and:

cable means connecting with the drive yoke means and with said drive cam means;

said sequential power means including a drive cylinder means having a rack and pinion gear means adapted to be mounted on said transport vehicle and operatively connected by the cable means to move the drive yoke means horizontally to thereby lower the hook means;

said drive cylinder means operatively connected by the cable means to rotate the drive cam means to move the hook members laterally outward into position for engagement with the automotive vehicle.

13. The invention according to claim 12, and:

said cable means having opposed end portions and operatively connected at one end to the drive cylinder means and extending lengthwise of the transporting vehicle to operate the hold-down device;

yoke biasing means including a spring biased take-up means for the cable means;

said cable means being attached at its opposite end portion to the spring biased take-up means;

said pinion gear means rotatable in a forward and in a reverse direction;

cam biasing means including spring biased take-up means for the cable means;

a pawl means positioned adjacent and engaging the pinion gear member to permit pinion gear rotation in a forward direction as the power cylinder means operates;

said yoke energy locking means including pawl means positioned adjacent and engaging the pinion gear means to permit pinion gear means rotation in a forward direction as the power cylinder means operates;

the cam energy locking means including a pawl means positioned adjacent and engaging the pinion gear means to permit rotation of the pinion gear means in a forward direction as the power cylinder means is operated.

14. A hold-down device for securing an automotive vehicle to a transporting vehicle and including:

hook means being mounted on the transporting vehicle and being adapted for engagement with and tying down of an associated automotive vehicle to the transporting vehicle;

hook support means rotatably mounted on said transporting vehicle and including a pair of spaced support guide arm means and including a support shaft joining said guide arms and said hook means pivotally mounted on said support shaft;

hook drive means operatively positioned on said support shaft and engageable with the hook means for powered transverse movement of said hook means;

a first power guide means operatively connected with the hook support means for imparting rotational and generally vertical displacement of the support means and the associated hook means; and, a second power drive means operatively connected with the hook drive means to thereby produce said powered transverse movement of said hook means into locking engagement with said automotive vehicle.

15. The invention according to claim 14, and said first power drive means including an operating yoke means having portions engaging the pivoted arm means for actuating the pivoted arm means to thereby raise and lower the hook means.

16. The invention according to claim 14, and said hook drive means including a cam means engaging the hook means to move the hook means pivotally into position with the automotive vehicle whereby raising of the guide means is followed by operation of the cam means to urge the hook means into position with the automotive vehicle.

17. The invention according to claim 15, and said spaced guide arm means positioned outboard of the hook means and each guide arm means including a slot means;

the operating yoke means having arm actuating portions engaging the slot means of the guide arm means for pivoting and rotating the arm means to thereby raise and lower the hook means;

the operating yoke means movable horizontally and the arm actuating portions of said yoke extending through the slot means in a respective arm member and movable through the slot portion to thereby rotate the respective arm member.

18. The invention according to claim 14, and a drive cylinder means being connected to the first power drive means and being connected to the second power drive means;

said drive cylinder means including a first power cylinder and a second power cylinder with each cylinder having associated rack member and pinion gear member operatively connected thereto;

each pinion gear member rotatable in a forward and in a reverse direction;

a pawl positioned adjacent and engaging each pinion gear to permit pinion gear rotation in a forward direction as each associated power cylinder operates;

first cable member and second cable member associated with the respective first and second power cylinders each having opposed end portions and operatively connected at one end to an associated power cylinder and extending lengthwise of the transporting vehicle to operate the hold-down device;

a pair of spring biased spools spaced along the length of the transporting vehicle from the drive cylinder means;

each of said first cable and second cable members being attached at its opposite end portion to a respective spring biased spool;

said first cable member in communication with first power drive means and said second cable member in communication with said second power drive means.

19. The invention according to claim 18, and the first and the second cable members each having a collar and a spring connection with the respective power drive means to cushion the transmission of operating forces from the cable members into said power drive means.

* * * * *